United States Patent
Oh (10) Patent No.: US 10,818,185 B2
(45) Date of Patent: Oct. 27, 2020

(54) PARKING SUPPORT APPARATUS, SYSTEM AND METHOD FOR VEHICLE

(71) Applicant: HYUNDAI MOBIS CO., LTD., Seoul (KR)

(72) Inventor: Jin Young Oh, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 255 days.

(21) Appl. No.: 16/047,000

(22) Filed: Jul. 27, 2018

(65) Prior Publication Data

US 2019/0035281 A1    Jan. 31, 2019

(30) Foreign Application Priority Data

Jul. 28, 2017 (KR) .................. 10-2017-0095855

(51) Int. Cl.
| | |
|---|---|
| G08G 1/16 | (2006.01) |
| G06K 9/00 | (2006.01) |
| G01S 15/931 | (2020.01) |
| G08G 1/14 | (2006.01) |

(52) U.S. Cl.
CPC ............ *G08G 1/168* (2013.01); *G01S 15/931* (2013.01); *G06K 9/00812* (2013.01); *G08G 1/164* (2013.01); *G01S 2015/934* (2013.01); *G01S 2015/938* (2013.01); *G08G 1/143* (2013.01)

(58) Field of Classification Search
CPC ........ G08G 1/168; G08G 1/164; G08G 1/143; G01S 15/931; G01S 2015/934; G01S 2015/938; G06K 9/00812
See application file for complete search history.

(56) References Cited

U.S. PATENT DOCUMENTS

| | | | | |
|---|---|---|---|---|
| 2009/0174574 | A1* | 7/2009 | Endo | ............. B60R 1/00 340/932.2 |
| 2010/0211267 | A1* | 8/2010 | Shimazaki | ........... B62D 15/028 701/42 |
| 2011/0022269 | A1* | 1/2011 | Nakazono | ................ G08G 1/14 701/41 |
| 2011/0210868 | A1* | 9/2011 | Yano | .................... B62D 15/027 340/932.2 |

(Continued)

FOREIGN PATENT DOCUMENTS

KR    10-2012-0022185    3/2012

*Primary Examiner* — Calvin Cheung (74) *Attorney, Agent, or Firm* — H.C. Park & Associates (57) ABSTRACT

A parking support apparatus for a vehicle may include: a detector configured to detect a distance between a vehicle and an object; a parking space recognizer configured to recognize a parking space based on a first distance detected through the detection unit, and generate first parking space recognition information; a parking controller configured to generate second parking space recognition information corresponding to the first parking space recognition information based on a second distance detected through the detection unit, while controlling parking of the vehicle; an error calculator and statistics analyzer configured to calculate errors between the first and second parking space recognition information, and statistically analyze the calculated errors; and a compensation parameter calculator configured to calculate a compensation parameter for compensating for one or more of the first distance and the first parking space recognition information, based on the errors.

15 Claims, 8 Drawing Sheets

(56) References Cited

U.S. PATENT DOCUMENTS

| | | | |
|---|---|---|---|
| 2011/0298926 A1* | 12/2011 | Katsunaga | G06K 9/00798 348/148 |
| 2013/0021171 A1* | 1/2013 | Hsu | G06K 9/00812 340/932.2 |
| 2013/0265428 A1* | 10/2013 | Yoon | G06K 9/00812 348/148 |
| 2014/0350804 A1* | 11/2014 | Park | B62D 15/0285 701/51 |
| 2015/0039173 A1* | 2/2015 | Beaurepaire | B62D 15/0285 701/23 |
| 2015/0344028 A1* | 12/2015 | Gieseke | B62D 15/028 701/1 |
| 2017/0109940 A1* | 4/2017 | Guo | G06T 3/00 |
| 2017/0261994 A1* | 9/2017 | Simmons | G05D 1/0891 |
| 2017/0355307 A1* | 12/2017 | Ha | B60Q 9/005 |
| 2018/0043905 A1* | 2/2018 | Kim | B60W 50/10 |
| 2019/0009773 A1* | 1/2019 | Miyahara | G05D 1/0088 |
| 2019/0084618 A1* | 3/2019 | Numata | B60R 21/00 |
| 2019/0162850 A1* | 5/2019 | Kempf | G01S 13/931 |
| 2019/0291722 A1* | 9/2019 | Maeda | G08G 1/16 |

* cited by examiner

PARKING SUPPORT APPARATUS, SYSTEM AND METHOD FOR VEHICLE

CROSS-REFERENCES TO RELATED APPLICATIONS

This application claims priority from and the benefit of Korean application No. 10-2017-0095855, filed on Jul. 28, 2017, which is hereby incorporated by reference for all purposes as if set forth herein.

BACKGROUND

Field

Exemplary embodiments relate to a parking support apparatus, system and method for a vehicle, and more particularly, to a parking support apparatus, system and method for a vehicle which recognizes a parking space using sensors and performs parking.

Discussion of the Background

In general, a smart parking assist system refers to a system which can assist an inexperienced driver to conveniently park a vehicle. The smart parking assist system determines the position of an obstacle using a camera or ultrasonic sensor attached on the vehicle during parking. When the driver selects parallel parking or perpendicular parking, the smart parking assist system performs a predetermined operation to assist the driver's parking.

Recently, more and more vehicles have a parking assist system (PAS) mounted therein. The PAS serves to sense an object at the rear of a vehicle during reverse parking, thereby providing convenience and safety to a driver. During the reverse parking, the vehicle having the PAS mounted therein drives an ultrasonic sensor mounted at the rear thereof to emit an ultrasonic signal, receives a reflected signal from an object at the rear, and calculates a distance to the object at the rear. Thus, the vehicle can be parked without colliding with the obstacle.

For the reverse parking of the vehicle, a process of correctly recognizing a parking space must be preceded. That is, the reverse parking of the vehicle is controlled on the basis of the length or width of the parking space, which is calculated by recognizing the parking space, and a parking start position for starting the reverse parking of the vehicle is decided according to the recognition of the parking space. Therefore, the correct recognition of the parking space is directly linked to safe parking.

As described above, the recognition of the parking space, which needs to be preceded during parking control, is performed by a sensor device such as an ultrasonic sensor mounted on the vehicle. Therefore, the performance of the sensor device decides whether the parking space can be correctly recognized. However, the performance of the sensor device of the vehicle, such as an ultrasonic device, may be reduced by environmental factors around the vehicle, for example, temperature, humidity and wind, and mismatches among a plurality of sensor devices mounted in the vehicle may also disturb the correct recognition of the parking space.

The related art of the present invention is disclosed in Korean Patent Publication No. 10-2012-0022185 published on Mar. 12, 2012.

The above information disclosed in this Background section is only for enhancement of understanding of the background of the invention and, therefore, it may contain information that does not constitute prior art.

SUMMARY

Exemplary embodiments of the present invention provide a parking support apparatus, system and method for a vehicle, which can compensate for performances of sensors used during a parking control process of a vehicle, thereby correctly recognizing a parking space and improving parking control performance.

Additional features of the invention will be set forth in the description which follows, and in part will be apparent from the description, or may be learned by practice of the invention.

An exemplary embodiment of the present invention discloses

In one embodiment, a parking support apparatus for a vehicle may include: a detector configured to detect a distance between a vehicle and an object around the vehicle; a parking space recognizer configured to recognize a parking space based on a first distance detected through the detection unit, and generate first parking space recognition information; a parking controller configured to generate second parking space recognition information corresponding to the first parking space recognition information based on a second distance detected through the detection unit, while controlling parking of the vehicle based on the first parking space recognition information; an error calculator and statistics analyzer configured to calculate errors between the first and second parking space recognition information, and statistically analyze the calculated errors; and a compensation parameter calculator configured to calculate a compensation parameter for compensating for one or more of the first distance and the first parking space recognition information, based on the errors.

The detector may include a first sensor installed at the side front of the vehicle, a second sensor installed at the side rear of the vehicle, a third sensor installed at the front of the vehicle, and a fourth sensor installed at the rear of the vehicle, the parking space recognizer may generate the first parking space recognition information by detecting the first distance through the first sensor unit, and the parking controller may generate the second parking space recognition information by detecting the second distance through one or more of the second to fourth sensor units.

Each piece of the first and second parking recognition information may include one or more of the length, width and angle of the parking space and first and second edges of the object around the vehicle.

The error calculator and statistics analyzer may accumulate the calculated errors, decide one or more errors serving as the base for calculating the compensation parameter, based on the standard deviation of the accumulated errors, and transfer the decided one or more errors to the compensation parameter calculation unit.

Another exemplary embodiment of the present invention discloses

In another embodiment, a parking support system for a vehicle may include: a first vehicle configured to generate first parking space recognition information by detecting a first distance to an object therearound and recognizing a parking space, generate second parking space recognition information corresponding to the first parking space recognition information by detecting a second distance to the object therearound while controlling parking based on the first parking space recognition information, and calculate an error between the first and second parking space recognition information; and a server configured to calculate a compensation parameter for compensating for one or more of the first distance and the first parking space recognition information, based on the error received from the first vehicle.

The first vehicle may include a first sensor installed at the side front thereof, a second sensor installed at the side rear thereof, a third sensor installed at the front thereof, and a fourth sensor installed at the rear thereof, generate the first parking space recognition information by detecting the first distance through the first sensor unit, and generate the second parking space recognition information by detecting the second distance through one or more of the second to fourth sensor units.

The server may decide one or more errors serving as the base for calculating the compensation parameter, using the standard deviation of one or more errors received from the first vehicle, and calculate the compensation parameter using the decided one or more errors.

The first vehicle may transmit its vehicle information and environment information to the server, and the server may calculate the compensation parameter separately for the vehicle information and environment information received from the first vehicle.

The parking support system may further include a second vehicle configured to generate third parking space recognition information by detecting a third distance to an object therearound and recognizing a parking space, and control parking based on the third parking space recognition information. The second vehicle may receive the compensation parameter from the server, and compensate for one or more of the third distance and the third parking space recognition information.

The second vehicle may transmit its vehicle information and environment information to the server, receive compensation parameters corresponding to the transmitted vehicle information and environment information from the server, and compensate for one or more of the third distance and the third parking space recognition information.

Another exemplary embodiment of the present invention discloses a parking support method for a vehicle which may include: generating, by a first vehicle, first parking space recognition information by detecting a first distance to an object therearound and recognizing a parking space; generating, by the first vehicle, second parking space recognition information corresponding to the first parking space recognition information by detecting a second distance to the object while controlling parking based on the first parking space recognition information; calculating, by the first vehicle, an error between the first and second parking space recognition information; and calculating, by a server, a compensation parameter for compensating for one or more of the first distance and the first parking space recognition information, based on the error received from the first vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a parking support apparatus, system and method for a vehicle in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

First Embodiment

Figure 1:
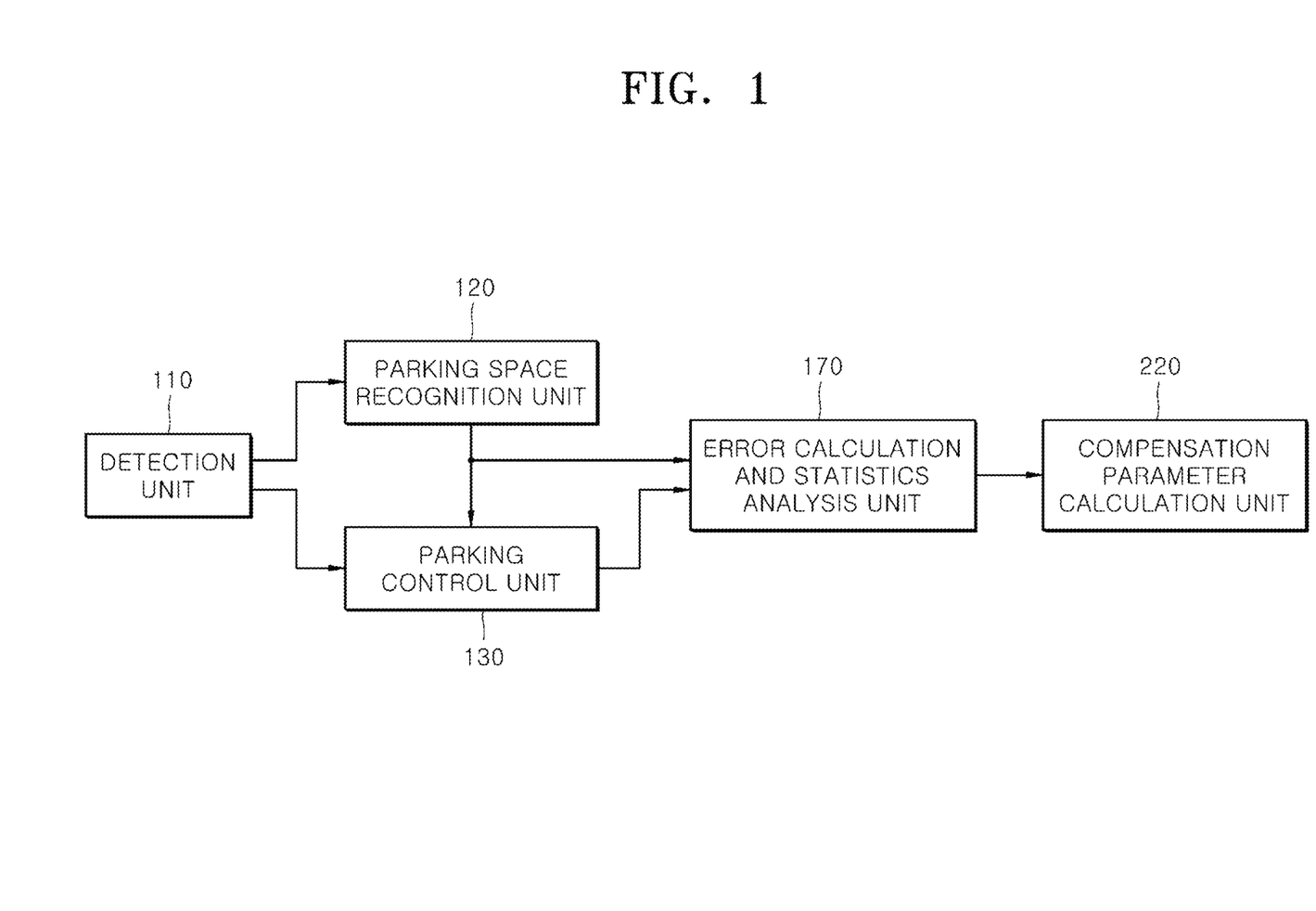
FIG. 1 is a block diagram illustrating a parking support apparatus for a vehicle in accordance with an exemplary embodiment of the present invention.
Figure 2:
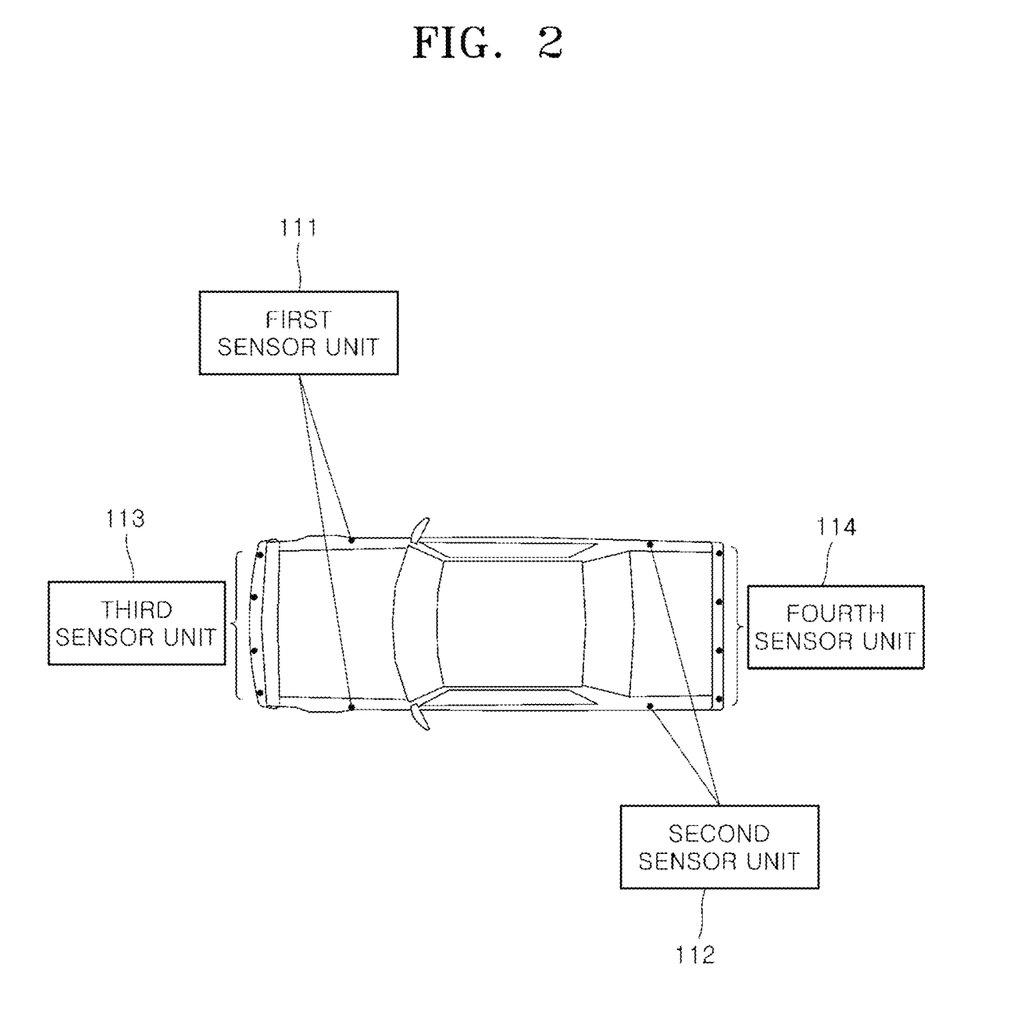
FIG. 2 illustrates the configuration of a detector in the parking support apparatus for a vehicle in accordance with the exemplary embodiment of the present invention.
Figure 3:
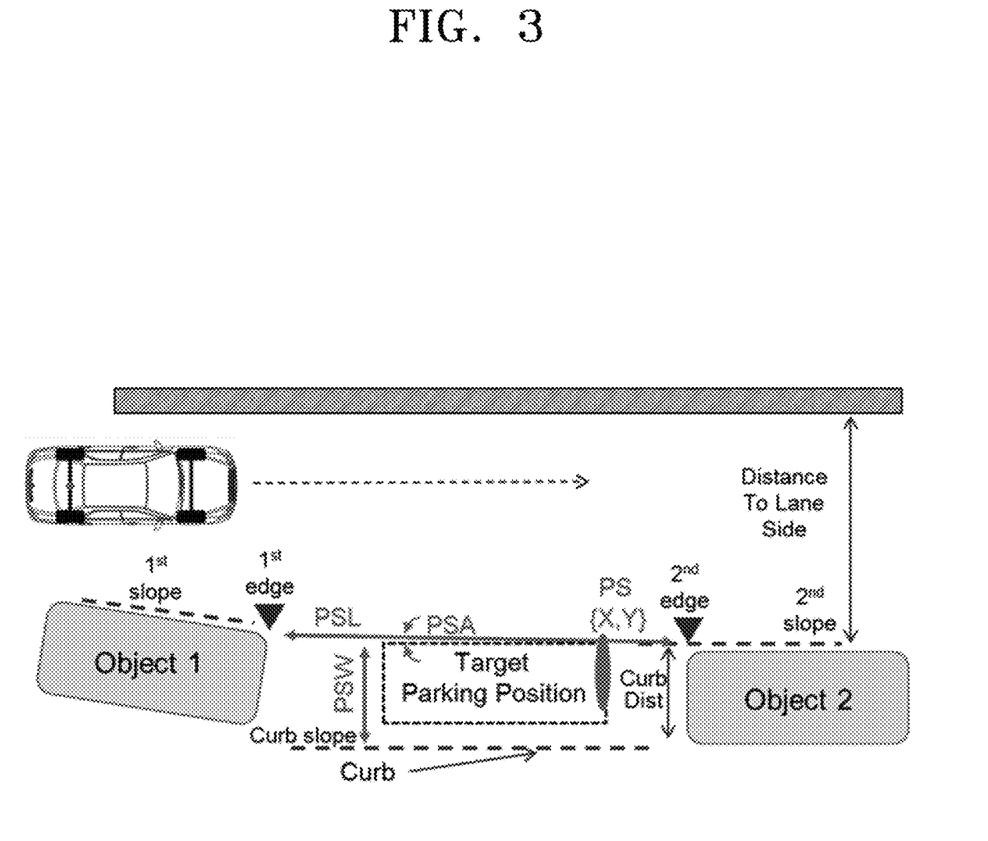
FIG. 3 is a diagram for describing parking space recognition information in the parking support apparatus for a vehicle in accordance with the exemplary embodiment of the present invention.
Figure 4:
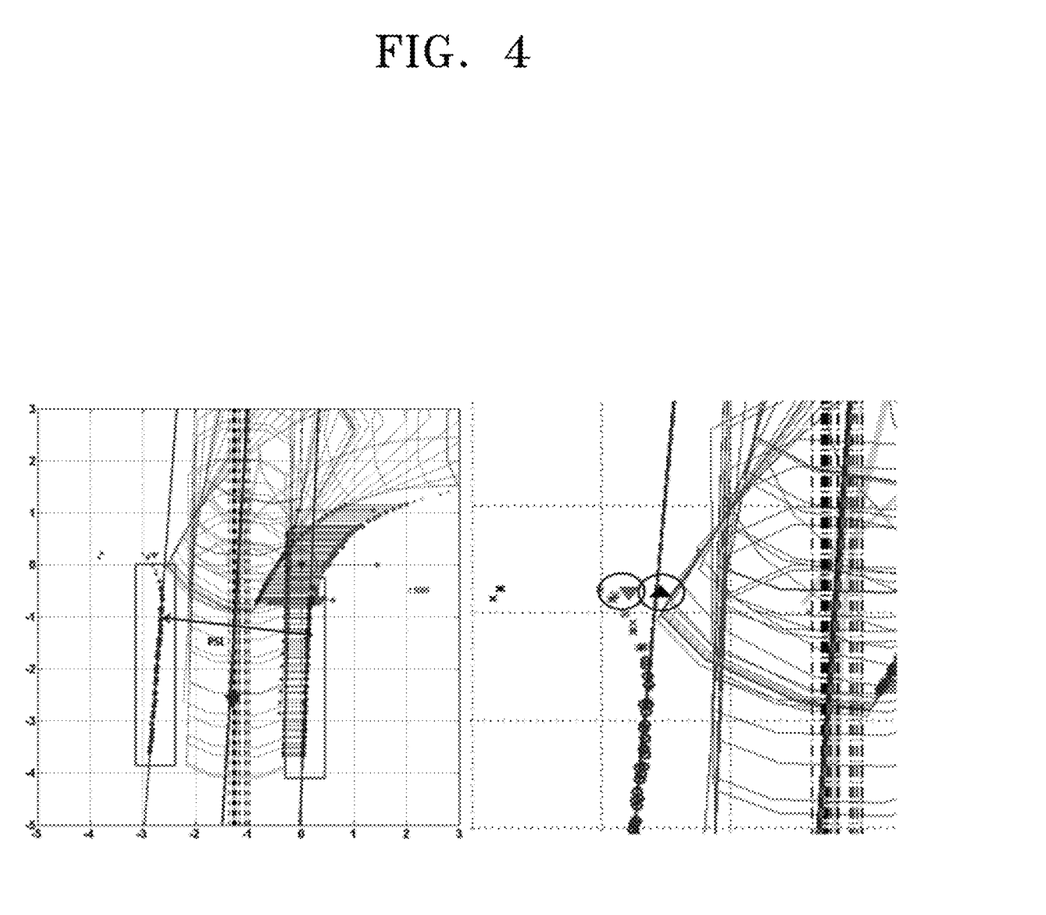
FIG. 4 is a diagram for describing an error between first and second parking space recognition information in the parking support apparatus for a vehicle in accordance with the exemplary embodiment of the present invention.

FIG. 1 is a block diagram illustrating a parking support apparatus for a vehicle in accordance with an embodiment of the present invention, FIG. 2 illustrates positions at which a detection unit or a detector of the parking support apparatus for a vehicle in accordance with the embodiment of the present invention is installed in the vehicle, FIG. 3 is a diagram for describing parking space recognition information in the parking support apparatus for a vehicle in accordance with the embodiment of the present invention, and FIG. 4 is a diagram for describing an error between first and second parking space recognition information in the parking support apparatus for a vehicle in accordance with the embodiment of the present invention.

Referring to FIG. 1, the parking support apparatus for a vehicle in accordance with the embodiment of the present invention may include a detection unit or detector 110, a parking space recognition unit or a parking space recognizer 120, a parking control unit or a parking controller 130, an error calculation and statistics analysis unit or an error calculator and statistics analyzer 170 and a compensation parameter calculation unit or a compensation parameter calculator 220.

The detector 110 may sense an object around the vehicle, detect a distance between the vehicle and the object, and transfer the detected distance to the parking space recognizer 120 and the parking controller 130. The detector 110 may include an ultrasonic sensor or radar sensor to sense an object around the vehicle. However, the present invention is not limited thereto, but the detector 110 may include other types of object sensors (for example, a light detection and ranging (LiDAR) sensor, camera sensor and infrared sensor). In the present embodiment, the detector 110 may detect the distance between the vehicle and the object through the ultrasonic sensor. Therefore, the detector 110 may send an ultrasonic signal toward the object around the vehicle, and measure the time until the ultrasonic signal returns to the detector 110 after reflecting from the object, in order to detect the distance to the object from the vehicle.

Referring to FIG. 2, the configuration of the detector 110 will be described in detail. The detector 110 may include a first sensor unit or a first sensor 111 installed at the side front of the vehicle, a second sensor unit or a second sensor 112 installed at the side rear of the vehicle, a third sensor unit or a third sensor 113 installed at the front of the vehicle, and a fourth sensor unit or a fourth sensor 114 installed at the rear of the vehicle. The first sensor 111 may include ultrasonic sensors installed at the left and right fronts of the vehicle, respectively, the second sensor 112 may include ultrasonic sensors installed at the left and right rears of the vehicle, respectively, the third sensor 113 may include one or more ultrasonic sensors installed at the front of the vehicle, and the fourth sensor 114 may include one or more ultrasonic sensors installed at the rear of the vehicle. FIG. 2 illustrates that the third and fourth sensor units 113 and 114 include four ultrasonic sensors installed in bumpers at the front and rear of the vehicle, respectively, but the installation positions and numbers of the ultrasonic sensors are not limited to the configuration of FIG. 2.

The parking space recognizer 120 may generate parking space recognition information by recognizing a parking space based on the distance detected through the detector 110, and transfer the generated parking space recognition information to the parking controller 130 and the error calculator and statistics analyzer 170 which will be described later. In order to clearly distinguish between the terms, the distance detected by the parking space recognizer 120 through the detector 110 may be represented by a first distance, and the parking space recognition information generated by the parking space recognizer 120 may be represented by first parking space recognition information. Furthermore, a distance detected by the parking controller 130 through the detector 110 may be represented by a second distance, and parking space recognition information generated by the parking controller 130 may be represented by second parking space recognition information.

Referring to FIG. 3, the process in which the parking space recognizer 120 recognizes a parking space and generates parking space recognition information will be described in detail. FIG. 3 is based on the supposition that the vehicle recognizes a parking space while traveling in an arrow direction. In this case, the parking space recognizer 120 may detect a first distance to an object positioned at the right of the vehicle through the first sensor 111 of the detector 110, and generate first parking space recognition information.

As illustrated in FIG. 3, the parking space recognition information may include one or more of the length PSL, width PSW and angle PSA of the parking space and first and second edges of objects around the vehicle. In the example illustrated in FIG. 3, the length of the parking space may be calculated as a distance r between the position coordinate of the first edge and the position coordinate of the second edge, the width of the parking space may be calculated as the y coordinate of the position coordinate of the second edge, and the angle of the parking space may be calculated on the basis of the slope of a straight line connecting the position coordinate of the first edge to the position coordinate of the second edge.

Since the first distance detected by the parking space recognizer 120 through the detector 110 and the first parking space recognition information generated on the basis of the first distance are utilized as basic information during the process in which parking of the vehicle is controlled by the parking controller 130, the first distance and the first parking space recognition information may require high precision. However, the precision of the first distance and the first parking space recognition information may be reduced by environmental factors (parking area and weather) and mismatches among sensor devices. Therefore, as described later, the parking support apparatus in accordance with the present embodiment may calculate a compensation parameter, and compensate for the first distance or the first parking space recognition information, in order to improve the precision of the first distance or the first parking space recognition.

The parking controller 130 may control parking of the vehicle through a motor driven power steering (MDPS), based on the first parking space recognition information received from the parking space recognizer 120. The parking controller 130 may correct a parking track based on a distance detected through the second sensor 112 of the detector 110, during the process of controlling the parking of the vehicle based on the first parking space recognition information.

In the present embodiment, the parking controller 130 may generate second parking space recognition information corresponding to the first parking space recognition information based on a second distance detected through the detector 110, while controlling the parking of the vehicle based on the first parking space recognition information. Since the second parking space recognition information corresponds to the first parking space recognition information, the second parking space recognition information may also include one or more of the length PSL, width PSW and angle PSA of the parking space and the first and second edges of the objects around the vehicle.

At this time, the parking controller 130 may generate the second parking space recognition information by detecting the second distance through one or more of the second to fourth sensor units 112 to 114 of the detector 110.

Specifically, when the vehicle attempts parallel parking or perpendicular parking, the parking controller 130 may sense an object at the front of the vehicle through the third sensor 113 in order to prevent a collision with the object, sense an object at the rear of the vehicle through the fourth sensor 114 in order to prevent a collision with the object, and sense an object at a side of the vehicle through the second sensor 112 in order to prevent a collision with the object.

Therefore, the parking controller 130 may generate the second parking space recognition information containing one or more of the length PSL, width PSW and angle PSA of the parking space and the first and second edges of the objects around the vehicle, based on the second distance detected through one or more of the second to fourth sensor units 112 to 114 of the detector 110, during the process of controlling parking according to the first parking space recognition information.

The second parking space recognition information generated on the basis of the second distance during the process in which the parking controller 130 controls the parking of the vehicle may be considered to have higher reliability than the first parking space recognition information generated by the parking space recognizer 120. In other words, when the parking controller 130 controls the parking of the vehicle, the distances to the objects can be more precisely detected because the detector 110 senses the objects for a longer time and the vehicle is relatively close to the objects. When the ultrasonic sensors employed in the present embodiment are implemented with sensors to which a short range wireless system is applied, the reliability can be further increased. Furthermore, when the parking controller 130 controls parallel parking, the parking controller 130 may sense the objects in duplicate through the third and fourth sensor units 113 and 114 each including four sensors. However, the parking space recognizer 120 may sense the objects through one sensor between the two sensors included in the first sensor 111. Therefore, the second parking space recognition information generated by the parking controller 130 may have higher precision than the first parking space recognition information generated by the parking space recognizer 120.

However, the second distance serving as the base for generating the second parking space recognition information may also contain distortion caused by the environmental factors. Thus, the parking support apparatus in accordance with the present embodiment may not compensate for the first distance or the first parking space recognition information using the second parking space recognition information as an absolute reference value, but compensate for the first distance or the first parking space recognition information based on errors (differences) between the first and second parking space recognition information.

For this operation, the error calculator and statistics analyzer 170 may calculate errors between the first and second parking space recognition information, and statistically analyze the calculated errors. FIG. 4 illustrates the errors between the first and second parking space recognition information.

The error calculated by the error calculator and statistics analyzer 170 may include one or more of errors of the information contained in the first parking space recognition information and the information contained in the second parking space recognition information corresponding to the first parking space recognition information. That is, the error calculated by the error calculator and statistics analyzer 170 may include one or more of |PSL(1)−PSL(2)|, |PSW(1)−PSW(2)|, |PSA(1)−PSA(2)|, |1st edge(1)−1st edge(2)| and |2nd edge(1)−2nd edge(2)|. Here, (1) and (2) may indicate that the corresponding information is contained in the first parking space recognition information and the second parking space recognition information, respectively.

The error calculator and statistics analyzer 170 may accumulate the calculated errors, decide one or more errors serving as the base for calculating a compensation parameter, using the standard deviation of the accumulated errors, and transfer the decided one or more errors to the compensation parameter calculator 220.

The process in which the error calculator and statistics analyzer 170 decides one or more errors serving as the base for calculating the compensation parameter may be performed in various manners. For example, the error calculator and statistics analyzer 170 may accumulate a predetermined number of calculated errors, and decide a reference standard deviation by calculating the standard deviation of the accumulated errors. Then, the error calculator and statistics analyzer 170 may include subsequently calculated errors in the accumulated errors, and calculate the standard deviation of the entire accumulated errors. In this case, when the standard deviation is equal to or less than the reference standard deviation, the error calculator and statistics analyzer 170 may set the subsequently calculated errors to the errors serving as the base for the calculation of the compensation parameter with the accumulated errors. On the other hand, when the standard deviation exceeds the reference standard deviation, the error calculator and statistics analyzer 170 may determine that the subsequently calculated errors cannot be used as the base for the calculation of the compensation parameter.

The compensation parameter calculator 220 may calculate a compensation parameter for compensating for one or more of the first distance and the first parking space recognition information, based on the errors received from the error calculator and statistics analyzer 170.

The process in which the compensation parameter calculator 220 calculates the compensator parameter based on the errors received from the error calculator and statistics analyzer 170 may be performed in various manners. For example, the compensation parameter calculator 220 may receive one or more errors from the error calculator and statistics analyzer 170, calculate the average of the errors, and apply the calculated average and a preset compensation constant (multiplication), in order to calculate the compensation parameter. The preset compensation constant may be designed to have different values, depending on whether the compensation parameter is used to compensate for the first distance or used to compensate for the first parking space recognition information. Furthermore, the preset compensation constant may be set in the compensation parameter calculator 220 in advance.

Therefore, the parking space recognizer 120 can receive the compensation parameter from the compensation parameter calculator 220, and compensate for one or more of the first distance and the first parking space recognition information, thereby more correctly recognizing the parking space before the parking control of the vehicle is started.

The parking support apparatus in accordance with the first embodiment can compensate for one or more of the first distance and the first parking space recognition information, using the errors between the first parking space recognition information generated on the basis of the first distance detected through the first sensor 111 of the detector and the second parking space recognition information generated on the basis of the second distance detected through one or more of the second to fourth sensor units 112 to 114 of the detection unit. Therefore, the parking support apparatus can minimize mismatches among the plurality of sensor devices mounted on the vehicle, and recognize the parking space with more precision.

Second Embodiment

Figure 5:
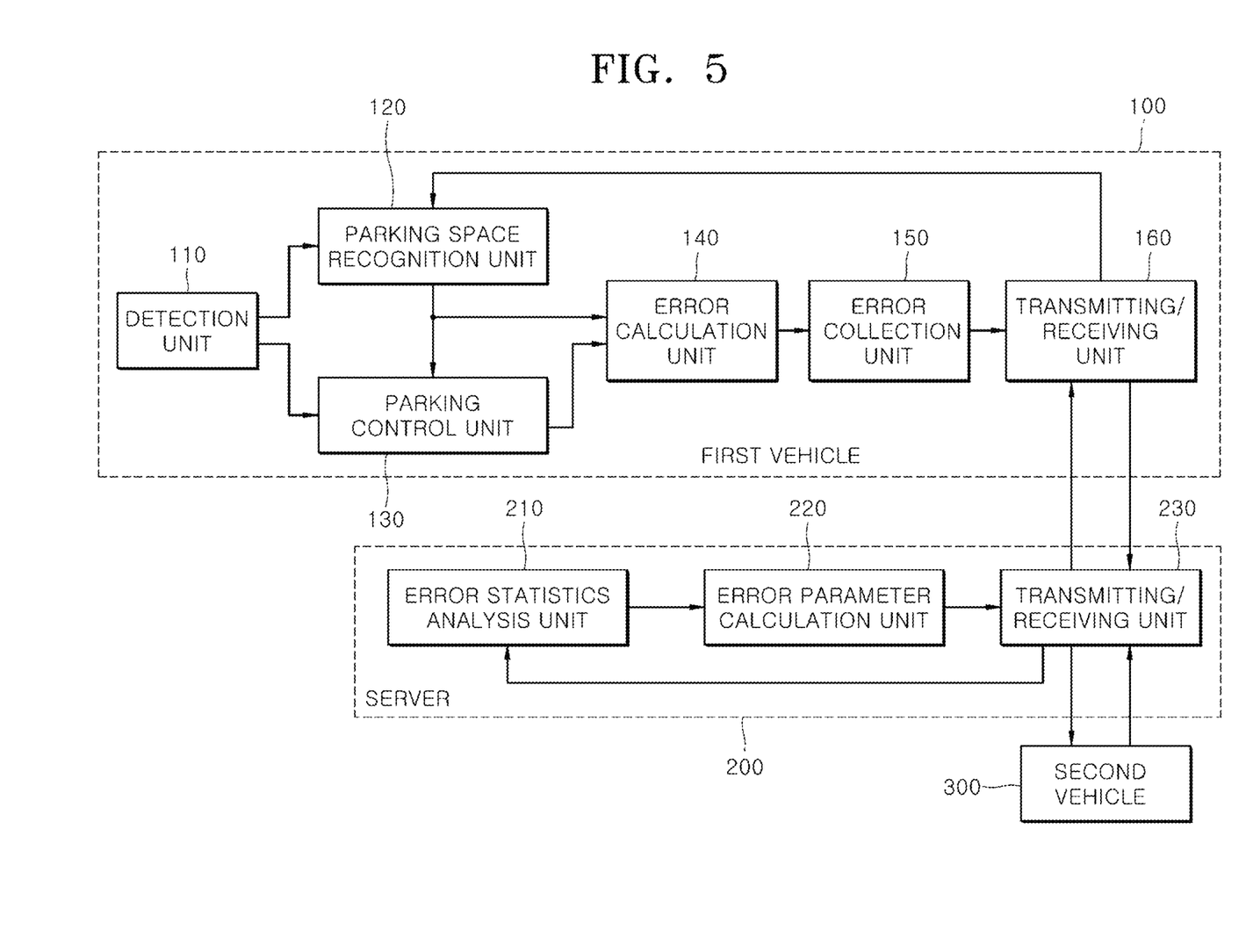
FIG. 5 is a block diagram illustrating a parking support system for a vehicle in accordance with an exemplary embodiment of the present invention.

FIG. 5 is a block diagram illustrating a parking support system for a vehicle in accordance with an embodiment of the present invention.

Referring to FIG. 5, the parking support system for a vehicle in accordance with the embodiment of the present invention may include a first vehicle 100, a server 200 and a second vehicle 300. The first vehicle 100 may include the detector 110, the parking space recognizer 120, the parking controller 130, an error calculator 140, an error collection unit 150 and a transmitting/receiving unit 160, and the server 200 may include an error statistics analyzer 210, a compensation parameter calculator 220 and a transmitting/receiving unit 230.

The second vehicle 300 may include the same components as those of the first vehicle 100. Furthermore, the components to perform the same functions as those of the first embodiment will be represented by the same reference numerals, and the duplicated descriptions thereof are omitted herein.

The parking support system in accordance with the second embodiment may compensate for one or more of the first distance and the first parking space recognition information by further considering regional and environmental factors in a parking space as well as mismatches among the sensor devices, and share a compensation parameter through the server 200 such that a plurality of vehicles can share and use the compensator parameter.

The first vehicle 100 may generate first parking space recognition information by detecting a first distance to an object therearound and recognizing a parking space, generate second parking space recognition information corresponding to the first parking space recognition information by detecting a second distance to the object therearound while controlling parking based on the first parking space recognition information, and calculate an error between the first and second parking space recognition information. The first vehicle 100 can perform the above-described function through the detector 110, the parking space recognizer 120, the parking controller 130 and the error calculator 140. Since the functions of the respective units have been described through the first embodiment, the detailed descriptions thereof are omitted herein.

The error calculator 140 may receive the first and second parking space recognition information from the parking space recognizer 120 and the parking controller 130, respectively, and calculate an error therebetween.

The error collection unit 150 may accumulate the errors received from the error calculator 140, and transfer the accumulated errors to the transmitting/receiving unit 160 when the number of accumulated errors is equal to or more than a predetermined value. That is, in order to remove the inefficiency of communication in which an error is transmitted to the server 200 whenever the error is calculated, the error collection unit 150 may collect errors until the number of accumulated errors is equal to or more than the predetermined value.

The transmitting/receiving unit 160 may serve as a communication interface for transmitting/receiving data to/from the server 200, and transmit the errors received from the error collection unit 150 to the server 200. Furthermore, the transmitting/receiving unit 160 may also transmit vehicle information and environment information to the server 200 as described later, and transfer a compensation parameter received from the server 200 to the parking space recognizer 120.

The server 200 may calculate a compensation parameter for compensating for one or more of the first distance and the first parking space recognition information, based on the errors received from the first vehicle 100. For this operation, the server 200 may include an error statistics analyzer 210, a compensation parameter calculator 220 and a transmitting/receiving unit 230.

The transmitting/receiving unit 230 may serve as a communication interface for transmitting/receiving data to/from the first and second vehicles 100 and 300. The transmitting/receiving unit 230 may receive the errors and the vehicle information and environment information from the first vehicle 100, and transfer the received data to the error statistics analyzer 210. Furthermore, the transmitting/receiving unit 230 may receive a compensation parameter from the compensation parameter calculator 220, and transmit the received compensation parameter to the first and second vehicles 100 and 300.

The error statistics analyzer 210 may decide one or more errors serving as the base for calculating the compensation parameter, based on the standard deviation of one or more errors received from the transmitting/receiving unit 230, and transfer the decided one or more errors to the compensation parameter calculator 220.

At this time, the error statistics analyzer 210 may divide the errors for the vehicle information and the environment information which are received from the transmitting/receiving unit 230, and decide one or more errors separated by the vehicle information and the environment information, the one or more errors serving as the base for calculating the compensation parameter.

The vehicle information may include vehicle type information, and the environment information may include position information, temperature information, humidity information, wind information and the like.

Therefore, the error statistics analyzer 210 may divide the errors according to the vehicle information and the environment information, statistically analyze the errors using the standard deviation, and transfer the analyzed errors to the compensation parameter calculator 220.

The compensation parameter calculator 220 may calculate a compensation parameter for compensating for the first distance and the first parking space recognition information, using the one or more errors received from the error statistics analyzer 210.

Furthermore, the compensation parameter calculator 220 may calculate compensation parameters separately for the vehicle information and the environment information which are received from the error statistics analyzer 210.

Therefore, the server 200 may store and manage the compensator parameters separately for the vehicle information and the environment information. When vehicle information and environment information are received from a vehicle, the server 200 may extract compensation parameters corresponding to the received vehicle information and environment information, and transmit the extracted compensation parameters to the corresponding vehicle.

Based on the communication between the first vehicle 100 and the server 200, the first vehicle 100 may transmit its vehicle information and environment information to the server 200 when the first vehicle 100 is parked later, receive compensation parameters corresponding to the transmitted vehicle information and environment information from the server 200, and compensate for one or more of the first distance and the first parking space recognition information, thereby correctly recognizing the parking space.

As described above, the second vehicle 300 may include the same components as those of the first vehicle 100. Therefore, the second vehicle 300 may generate third parking space recognition information by detecting a third distance to an object therearound and recognizing a parking space, control parking based on the third parking space recognition information, receive a compensation parameter from the server 200, and compensate for one or more of the third distance and the third parking space recognition information. In order to clearly distinguish between the terms, the distance detected through the detector mounted in the second vehicle 300 may be represented by the third distance, and the parking space recognition information generated by the parking space recognizer 120 mounted in the second vehicle 300 may be represented by the third parking space recognition information.

At this time, the second vehicle 300 may transmit its vehicle information and environment information to the server 200 during parking, receive compensator parameters corresponding to the transmitted vehicle information and environment information from the server 200, and compensate for one or more of the third distance and the third parking space recognition information.

That is, since the server 200 stores the compensation parameters separated by the vehicle information and the environment information and the compensation parameters stored in the server 200 can be shared by a plurality of vehicles, the second vehicle 300 may transmit the vehicle information and environment information to the server 200, the vehicle information and environment information including vehicle type information, position information and weather information, receive compensation parameters corresponding to the vehicle information and environment information, and compensate for one or more of the third distance and the third parking space recognition information, thereby more correctly recognizing the parking space.

Therefore, since the compensation parameters of the second embodiment are calculated in consideration of mismatches among the sensor devices mounted in the vehicle and stored and managed separately for the vehicle information and environment information by the server 200, each of the vehicles can minimize the influence of the parking position and weather, and recognize the parking space using the compensation parameters suitable for the type of the vehicle. Thus, the vehicle can correctly recognize the parking space without a large influence of the environment factors.

Figure 6:
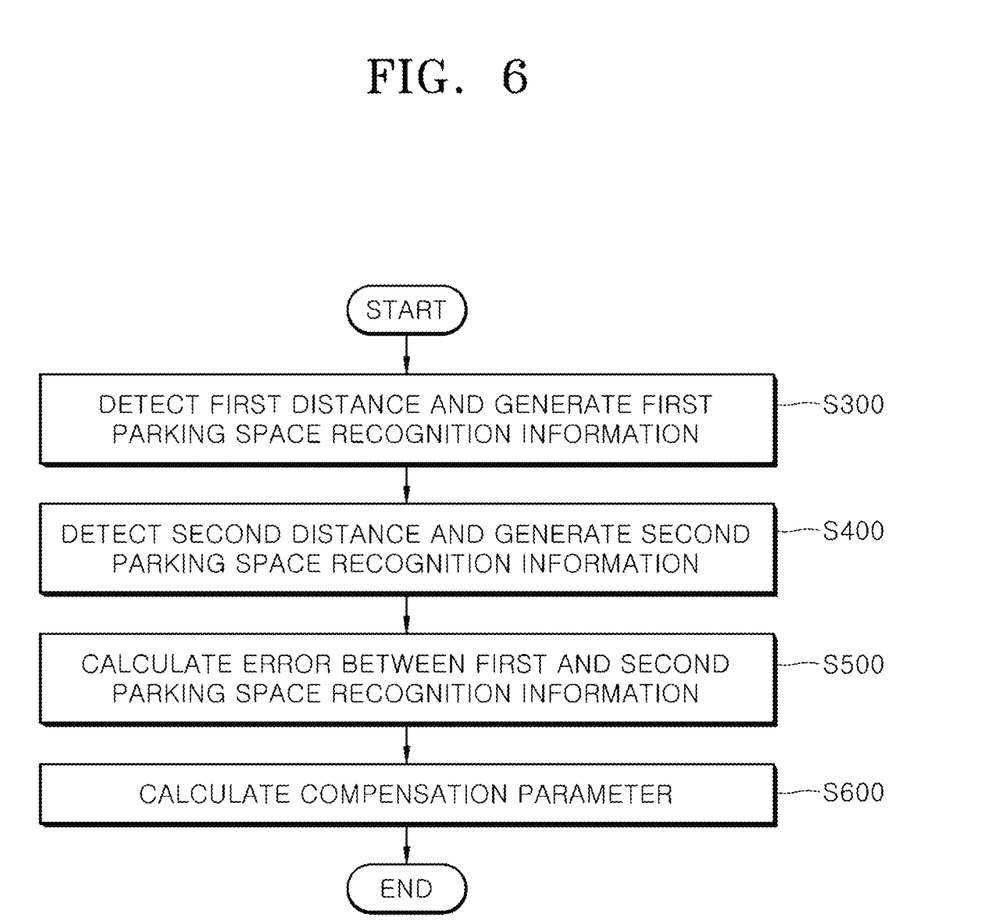
FIGS. 6 to 8 are flowcharts illustrating a parking support method for a vehicle in accordance with an exemplary embodiment of the present invention.
Figure 7:
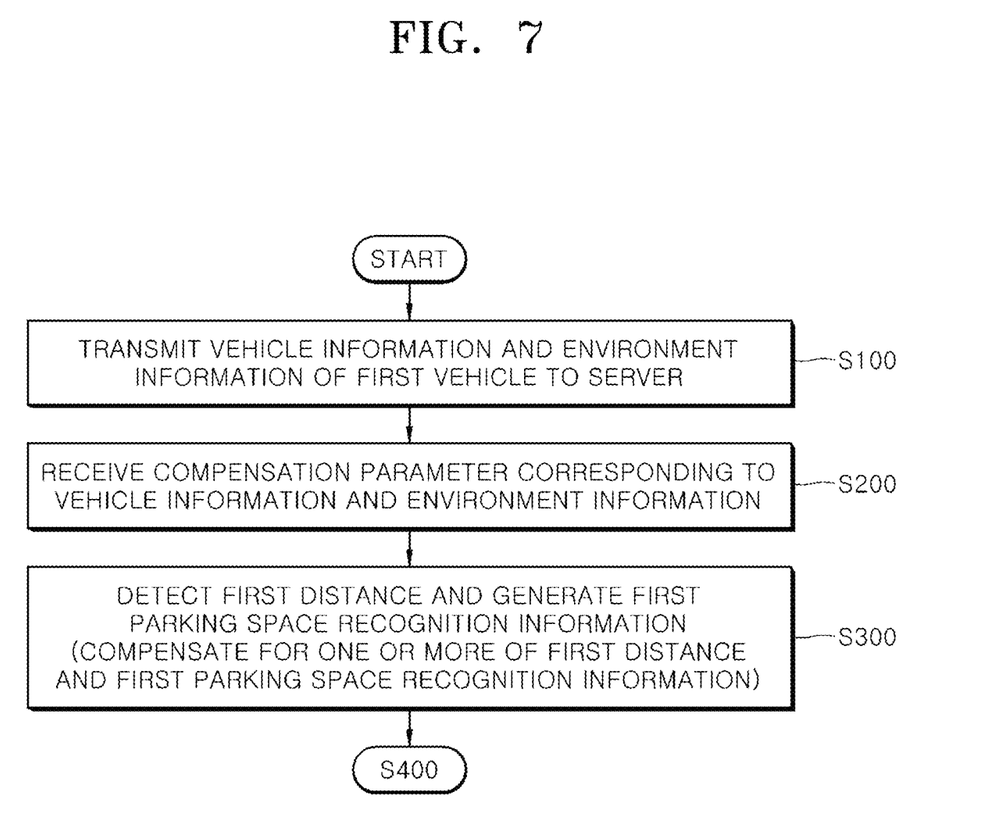
Figure 8:
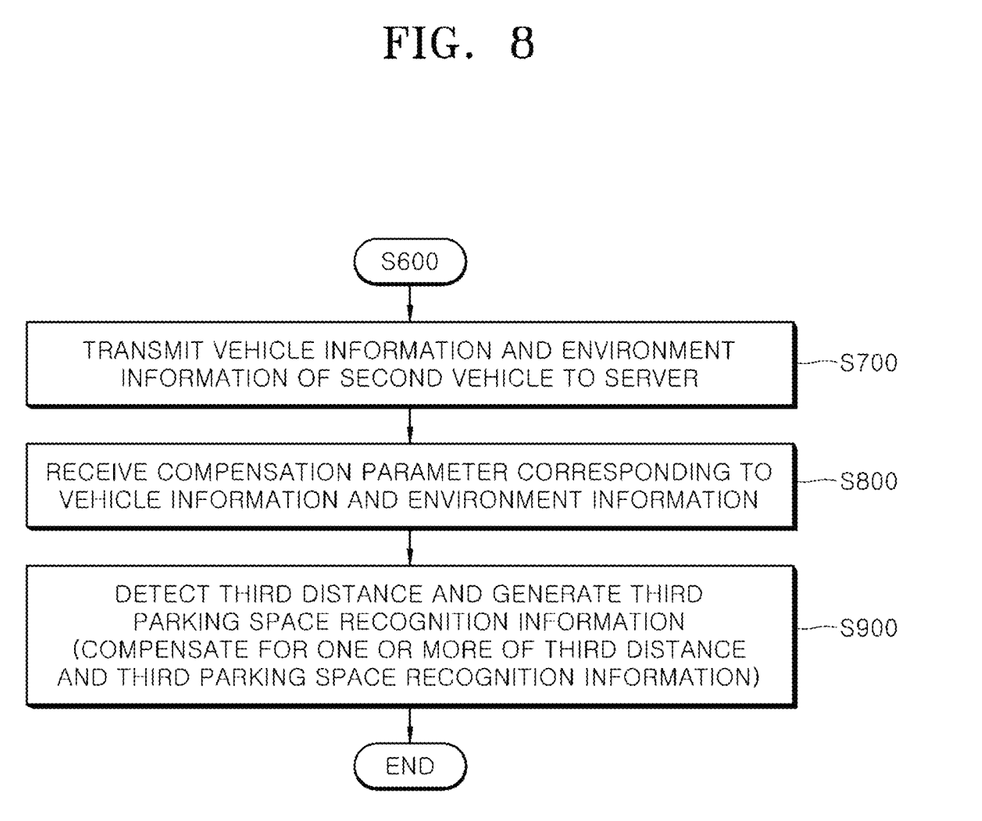

FIGS. 6 to 8 are flowcharts illustrating a parking support method for a vehicle in accordance with an embodiment of the present invention.

Referring to FIG. 6, the parking support method for a vehicle in accordance with the embodiment of the present invention will be described as follows. The first vehicle 100 may generate first parking space recognition information by detecting a first distance to an object therearound and recognizing a parking space, at step S300.

As described above, the first vehicle 100 may include the detector 110 to detect the distance to the object. At step S300, the first vehicle 100 may detect the first distance through the first sensor 111 of the detector 110, in order to generate the first parking space recognition information.

The first vehicle 100 may generate second parking space recognition information corresponding to the first parking space recognition information by detecting a second distance to the object therearound while controlling parking based on the first parking space recognition information, at step S400. At step S400, the first vehicle 100 may detect the second distance through one or more of the second to fourth sensor units 112 to 114 of the detector 110, in order to generate the second parking space recognition information.

The first vehicle 100 may calculate an error between the first and second parking space recognition information, and transmit the calculated error to the server 200, at step S500.

The server 200 may receive the error from the first vehicle 100, and calculate a compensation parameter for compensating for one or more of the first distance and the first parking space recognition information, at step S600.

At step S600, the server 200 may decide one or more errors serving as the base for calculating the compensation parameter, using the standard deviation of one or more errors received from the first vehicle 100, and calculate the compensation parameter using the decided one or more errors.

As illustrated in FIG. 7, the parking support method in accordance with the present embodiment may further include step S100 in which the first vehicle 100 transmits its vehicle information and environment information to the server 200 and step S200 in which the first vehicle 100 receives compensation parameters from the server 200, the compensation parameters corresponding to the vehicle information and environment information transmitted to the server 200.

Therefore, at step S300, the first vehicle 100 may compensate for one or more of the first distance and the first parking space recognition information using the compensation parameters received at step S200. Furthermore, at step S600, the server 200 may calculate the compensation parameters separately for the vehicle information and environment information received from the first vehicle 100 at step S100.

The present embodiment may also be applied to the second vehicle 300 distinguished from the first vehicle 100 as illustrated in FIG. 8. Specifically, when the compensation parameters are calculated by the server 200 after steps S300 to S600, the compensation parameters calculated by the server 200 may also be transmitted to the second vehicle 300.

That is, after step S600, the parking support method in accordance with the present embodiment may further include step S900 in which the second vehicle 300 generates third parking space recognition information by detecting a third distance to an object therearound and recognizing a parking space, and controls parking based on the third parking space recognition information.

At this time, the second vehicle 300 may transmit its vehicle information and environment information to the server 200 at step S700, and receive compensation parameters from the server 200, the compensation parameters corresponding to the vehicle information and environment information transmitted to the server 200, at step S800. Thus, at step S900, the second vehicle 300 may compensate for one or more of the third distance and the third parking space recognition information, using the compensation parameters received at step S800.

As such, the parking support system and method in accordance with the present embodiment can correctly recognize a parking space by compensating for the reduction in performance of the sensors, thereby improving the parking control performance of the vehicle. Furthermore, the parking support system and method can share the compensation parameters for compensating for the reduction in performance of the sensors with the plurality of vehicles through the remote server. Therefore, the vehicle can be stably parked regardless of regional and environmental factors in the region where the vehicle is located.

Although preferred embodiments of the invention have been disclosed for illustrative purposes, those skilled in the art will appreciate that various modifications, additions and substitutions are possible, without departing from the scope and spirit of the invention as defined in the accompanying claims.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A parking support apparatus for a vehicle, comprising:
a detector configured to detect a distance between the vehicle and an object around the vehicle;
a parking space recognizer configured to recognize a parking space based on a first distance detected through the detector, and generate a first parking space recognition information;
a parking controller configured to generate a second parking space recognition information corresponding to the first parking space recognition information based on a second distance detected through the detector, while controlling parking of the vehicle based on the first parking space recognition information;
an error calculator and statistics analyzer configured to calculate errors between the first parking space recognition information and the second parking space recognition information, and statistically analyze the calculated errors; and
a compensation parameter calculator configured to calculate a compensation parameter for compensating for one or more of the first distance and the first parking space recognition information, based on the errors,
wherein each piece of the first parking recognition information and the second parking recognition information comprises one or more of a length, a width and an angle of the parking space and a first edge and a second edge of the object around the vehicle.

2. The parking support apparatus of claim 1, wherein the detector comprises a first sensor installed at a side of a front of the vehicle, a second sensor installed at a side of a rear of the vehicle, a third sensor installed at the front of the vehicle, and a fourth sensor installed at the rear of the vehicle,
the parking space recognizer generates the first parking space recognition information by detecting the first distance through the first sensor, and
the parking controller generates the second parking space recognition information by detecting the second distance through one or more of the second sensor, the third sensor, and the fourth sensor.

3. The parking support apparatus of claim 1, wherein the error calculator and statistics analyzer is configured to accumulate the calculated errors, choose one or more errors serving as a base for calculating the compensation parameter, based on a standard deviation of the accumulated errors, and transfer the chosen one or more errors to the compensation parameter calculator.

4. A parking support system for a vehicle, comprising:
a first vehicle configured to generate a first parking space recognition information by detecting a first distance to an object from the first vehicle and recognizing a parking space, generate a second parking space recognition information corresponding to the first parking space recognition information by detecting a second distance to the object from the first vehicle while controlling parking based on the first parking space recognition information, and calculate an error between the first parking space recognition information and the second parking space recognition information; and
a server configured to calculate a compensation parameter for compensating for one or more of the first distance and the first parking space recognition information, based on the error received from the first vehicle,
wherein the first vehicle comprises a first sensor installed at a side of a front of the first vehicle, a second sensor installed at a side of a rear of the first vehicle, a third sensor installed at the front of the first vehicle, and a fourth sensor installed at the rear of the first vehicle, and the first vehicle is configured to generate the first parking space recognition information by detecting the first distance through the first sensor, and generate the second parking space recognition information by detecting the second distance through one or more of the second sensor, the third sensor, and the fourth sensor.

5. The parking support system of claim 4, wherein the server is configured to choose one or more errors serving as a base for calculating the compensation parameter, using a standard deviation of one or more errors received from the first vehicle, and calculates the compensation parameter using the chosen one or more errors.

6. The parking support system of claim 4, wherein the first vehicle is configured to transmit its vehicle information and environment information to the server, and
the server is configured to calculate the compensation parameter separately based on the vehicle information and environment information received from the first vehicle.

7. The parking support system of claim 6, wherein the first vehicle is configured to receive compensation parameters corresponding to the vehicle information and environment information transmitted to the server from the server, and compensate for one or more of the first distance and the first parking space recognition information using the received compensation parameters.

8. The parking support system of claim 6, further comprising a second vehicle configured to generate a third parking space recognition information by detecting a third distance to an object from the second vehicle and recognizing a parking space, and control parking based on the third parking space recognition information,
wherein the second vehicle is configured to receive the compensation parameter from the server, and compensate for one or more of the third distance and the third parking space recognition information.

9. The parking support system of claim 8, wherein the second vehicle is configured to transmit its vehicle information and environment information to the server, receive compensation parameters corresponding to the transmitted vehicle information and environment information from the server, and compensate for one or more of the third distance and the third parking space recognition information.

10. A parking support method for a vehicle, comprising:
generating, by a first vehicle, a first parking space recognition information by detecting a first distance to an object from the first vehicle and recognizing a parking space;
generating, by the first vehicle, a second parking space recognition information corresponding to the first parking space recognition information by detecting a second distance to the object from the first vehicle while controlling parking based on the first parking space recognition information;
calculating, by the first vehicle, an error between the first parking space recognition information and the second parking space recognition information;
calculating, by a server, a compensation parameter for compensating for one or more of the first distance and the first parking space recognition information, based on the error calculated by the first vehicle; and
comprising transmitting, by the first vehicle, a vehicle information and an environment information of the first vehicle to the server,
wherein in the step of calculating of the compensation parameter,
the server is configured to calculate the compensation parameter separately for the vehicle information and the environment information transmitted from the first vehicle.

11. The parking support method of claim 10, wherein the first vehicle comprises a first sensor installed at the side front thereof, a second sensor installed at the side rear thereof, a third sensor installed at the front thereof, and a fourth sensor installed at the rear thereof,
wherein in the generating of the first parking space recognition information, the first vehicle generates the first parking space recognition information by detecting the first distance through the first sensor, and
in the step of generating of the second parking space recognition information, the first vehicle is configured to generate the second parking space recognition information by detecting the second distance through one or more of the second sensor, the third sensor, and the fourth sensor.

12. The parking support method of claim 10, wherein in the step of calculating of the compensation parameter,
the server is configured to choose one or more errors serving as a base for calculating the compensation parameter, using a standard deviation of one or more errors calculated by the first vehicle, and calculate the compensation parameter using the chosen one or more errors.

13. The parking support method of claim 10, further comprising receiving, by the first vehicle, compensation parameters from the server, the compensation parameters corresponding to the vehicle information and the environment information transmitted to the server,
wherein in the step of generating of the first parking space recognition information,
the first vehicle is configured to compensate for one or more of the first distance and the first parking space recognition information using the compensation parameters received from the server.

14. The parking support method of claim 10, further comprising generating, by a second vehicle, a third parking space recognition information by detecting a third distance to an object from the second vehicle and recognizing a parking space, and controlling parking based on the third parking space recognition information.

15. The parking support method of claim 14, further comprising:
transmitting, by the second vehicle, a vehicle information and an environment information of the second vehicle to the server; and
receiving, by the second vehicle, compensation parameters from the server, the compensation parameters corresponding to the vehicle information and the environment information transmitted to the server,
wherein in the step of controlling of the parking,
the second vehicle is configured to compensate for one or more of the third distance and the third parking space recognition information using the compensation parameters received from the server.

* * * * *